United States Patent [19]

Peiffer et al.

[11] Patent Number: 4,537,688

[45] Date of Patent: Aug. 27, 1985

[54] LOW AND HIGH TEMPERATURE DRILLING FLUIDS BASED ON SULFONATED TERPOLYMER IONOMERS

[75] Inventors: Dennis G. Peiffer, East Brunswick; Robert D. Lundberg, Bridgewater, both of N.J.; Kenneth W. Pober, Houston, Tex.

[73] Assignee: Exxon Research and Engineering Co., Florham Park, N.J.

[21] Appl. No.: 547,906

[22] Filed: Nov. 2, 1983

[51] Int. Cl.$^3$ .................................................. C09K 7/06
[52] U.S. Cl. .............................. 252/8.5 M; 252/8.5 P
[58] Field of Search ........................ 252/8.5 M, 8.5 P

[56] References Cited

U.S. PATENT DOCUMENTS

| | | | |
|---|---|---|---|
| 2,650,905 | 9/1953 | Fordyce et al. | 252/8.5 |
| 4,425,455 | 1/1984 | Turner et al. | 252/8.5 X |
| 4,425,461 | 1/1984 | Turner et al. | 252/8.5 X |
| 4,425,462 | 1/1984 | Turner et al. | 252/8.5 X |
| 4,447,338 | 5/1984 | Lundberg et al. | 252/8.5 |

FOREIGN PATENT DOCUMENTS 0072245 2/1983 European Pat. Off. ............ 252/8.5

*Primary Examiner*—Herbert B. Guynn

*Attorney, Agent, or Firm*—Richard E. Nanfeldt

[57] ABSTRACT

The present invention relates to sulfonated thermoplastic terpolymers which are terpolymers of t-butyl styrene, styrene and sodium styrene sulfonate wherein these sulfonated terpolymers function as viscosification agents when added to oil-based drilling muds which are the fluids used to maintain pressure, cool drill bits and lift cuttings from the holes in the drilling operation for oil and gas wells. The sulfonated thermoplastic terpolymer of the latex have about 5 to 100 meg. of sulfonate groups per 100 grams of the sulfonated thermoplastic terpolymer, wherein the sulfonated groups are neutralized with a metallic cation or an amine or ammonium counterion. A polar cosolvent can optionally be added to the mixture of oil drilling mud and sulfonated thermoplastic polymer, wherein the polar cosolvent increases the solubility of the sulfonated thermoplastic terpolymer in the oil drilling mud by decreasing the strong ionic interactions between the sulfonate groups of the sulfonated polymer.

The drilling muds formed from these latices of the sulfonated thermoplastic terpolymers exhibits markedly improved low and high temperature rheological properties as compared to drilling muds formed from sulfonated thermoplasitc copolymers.

11 Claims, No Drawings

LOW AND HIGH TEMPERATURE DRILLING FLUIDS BASED ON SULFONATED TERPOLYMER IONOMERS

FIELD OF THE INVENTION

The present invention relates to sulfonated thermoplastic polymers which are terpolymers of styrene/t-butyl styrene and sodium styrene sulfonate, wherein these sulfonated polymers function as viscosification agents when added to oil-based drilling muds which are the fluids used to maintain pressure, cool drill bits and lift cuttings from the holes in the drilling operation for oil and gas wells. The sulfonated thermoplastic terpolymers of the latex have about 5 to about 100 meq. of sulfonate groups per 100 grams of the sulfonated thermoplastic polymer, wherein the sulfonated groups are neutralized with a metallic cation or an amine or ammonium counterion. A polar cosolvent can optionally be added to the mixture of oil drilling mud and sulfonated thermoplastic terpolymer, wherein the polar cosolvent increases the solubility of the sulfonated thermoplastic polymer in the oil drilling mud by decreasing the strong ionic interactions between the sulfonate groups of the sulfonated polymer.

BACKGROUND OF THE INVENTION

In the field of drilling in the exploration for oil and gas, an important component is that of the formulation of drilling muds. Drilling muds are the fluids which are used to maintain pressure, cool drill bits and lift cuttings from the holes and vary in composition over a wide spectrum. Generally, drilling muds are based on aqueous formulations or oil-based formulations.

The drilling muds formed from these latices of the sulfonated thermoplastic terpolymers exhibit markedly improved low and high temperature rheological properties as compared to drilling muds formed from sulfonated thermoplastic copolymers.

A conventional oil-based drilling mud formulation is comprised of basically the following ingredients: oil (generally No. 2 diesel fuel), emulsifying agents (alkaline soaps and fatty acids), wetting agents (dodecylbenzene sulfonate), water, barite or barium sulfate, (weighting agent), asbestos (employed as viscosification agent) and/or, amine-treated clays (also as viscosification agent).

The above combination of ingredients is generally formulated to possess various weights based primarily on amount of barite added. For example, a typical drilling mud can vary in specific gravity from a range of about 7 pounds per gallon up to 17 pounds per gallon or even greater. This variation in specific gravity is primarily controlled by the amount of barite added. The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formation. The use of the oil-based formulations circumvents this problem. However, it is observed that the current oil-based drilling muds have some significant disadvantages. One disadvantage is that the incorporation of asbestos or asbestos fines can incur significant health problems, both during the mud formulation and potentially during the subsequent use of such formulations. Therefore, it is desirable to eliminate the use of asbestos completely in such drilling muds. On the other hand, the use of substitutes for asbestos in this application has heretofore not been particularly successful in that the resulting viscosification agents must maintain adequate viscosities under the drilling conditions which can involve high temperature and high shear conditions.

There has been a substantial need for a drilling fluid which would exhibit good performance at low and high temperature in water sensitive formations. Past experience has shown that oil-based drilling fluids can provide good performance in water sensitive formations, and the state of the art systems can perform well up to about 350° F. Typically, in such formations, the failure of the viscosities in current muds is circumvented by the addition of more viscosifier during the circulation of the drilling mud. While this solution is adequate at moderate temperatures, when much higher temperatures are encountered (example: geothermal wells or natural gas wells), the degradation of the viscosifier can be so rapid that the additional costs for a viscosifier can be uneconomical. There is a need, therefore, for drilling fluids which can maintain their viscosity and gel strength at temperatures up to and exceeding 400° F. These needs are not adequately met by the current drilling fluids, even with the oil-based drilling muds often employed.

The instant invention will describe a family of viscosifiers suitable for oil-based drilling muds which offer thermal stability over a very broad temperature range, which appears to go far beyond that offered by state-of-the-art drilling muds. The types of viscosifiers employed currently in oil-based drilling muds typically are asbestos or amine coated clays. Such systems provide adequate gel strength (i.e., the ability to suspend solids) at temperatures up to 300° F.

We have previously shown that lightly sulfonated polystyrene is very effective as a viscosifier for oil-based drilling muds. We have found that sulfopolystyrene provides good viscosification characteristics at temperatures exceeding 150° F. when formulated in mud based on saturated salt water. Higher temperatures (300°, 400° F.) encountered in accelerated aging studies for 15 hours have shown that sulfo-polystyrene enhances its efficacy at those higher temperatures. However, at low temperatures (<150° F.), sulfo-polystyrene was not an effective viscosifier. That is, the drilling mud containing this polymer needed to be "thermally activated" before acceptable rheological properties were attained. However, based on available information, it appeared that until that time, there was no viscosifier which was effective at temperatures around 400° F. for the typical aging period of 16 hours. The instant invention will describe polymeric materials capable of providing excellent rheological properties, specially gel strength, at low and high temperatures (400° F.). These materials may be effective at even higher temperatures.

The mechanism through which this new family of sulfonated terpolymer ionomers is operative is not completely understood. The preferred species of these materials is lightly sulfonated styrene: t-butylstyrene copolymers with a sulfonate level running at about 5 to about 100 milliequivalents of sulfonate groups per 100 grams of sulfonated terpolymer. It is believed that this polymer is marginally soluble in the hydrocarbon phase and completely insoluble in the aqueous phase of a formulated mud and, therefore, the polymer is probably located at the interface. As a consequence, this polymer is an extremely effective viscosifier even at quite low levels.

The instant invention discloses a class of sulfonated thermoplastic terpolymers which are effective viscosifiers at both room temperature and 400° F. These sulfonated thermoplastic polymers are terpolymers of t-butyl styrene/styrene/sodium styrene sulfonate. These terpolymers provide excellent gel strengths at both room temperature and 400° F.

A second facet of the instant invention relates to the use of these materials in formulations which employ high concentrations of salt in the aqueous phase. The sulfonated terpolymers of this invention do not lose some of their efficacy in salt water. It has been found that the use of a suitable non-ionic emulsifier with the sulfonated terpolymers is not required in the formulations to be are effective with salt water. Therefore, these terpolymers give formulations which perform well at high temperatures and in the presence of salt water phases, which is a highly desired objective in the drilling fluids industry.

SUMMARY OF THE INVENTION

The present invention relates to sulfonated thermoplastic polymers which are terpolymers of t-butyl styrene, styrene and sodium styrene sulfonate, wherein these sulfonated terpolymers function as viscosification agents when added to oil-based drilling muds which are the fluids used to maintain pressure, cool drill bits and lift cuttings from the holes in the drilling operation for oil and gas wells. The sulfonated thermoplastic terpolymers have about 5 to about 100 meq. of sulfonate groups per 100 grams of the sulfonated thermoplastic terpolymer, wherein the sulfonated groups are neutralized with a metallic cation or an amine or ammonium counterion. A polar cosolvent can optionally be added to the mixture of oil drilling mud and sulfonated thermoplastic polymer, wherein the polar cosolvent increases the solubility of the sulfonated thermoplastic polymer in the oil drilling mud by decreasing the strong ionic interactions between the sulfonate groups of the sulfonated terpolymer.

GENERAL DESCRIPTION OF THE INVENTION

The present invention describes a new class of viscosification agents for oil-based drilling muds which are used during operation of gas and oil wells, wherein these viscosification agents are terpolymers of t-butyl styrene/styrene/sodium styrene sulfonate. The oil-based drilling muds of the instant invention minimally comprise, but can also include other additives; an organic liquid such as an oil, fresh water or salt water, an emulsifier, a wetting agent, a weighting material and a sulfonated thermoplastic terpolymer. In general, the oil-based drilling mud has a specific gravity of about 7 pounds per gallon to about 20 pounds per gallon, more preferably about 10 to about 16, and most preferably about 12 to about 16. A typical oil-based drilling mud, as envisioned by the instant invention, comprises: an oil; about 1 to about 10 parts by weight of water per 100 parts by weight of the oil, more preferably about 3 to about 5; and 20 to about 50 lb/bbl. of an emulsifier and/or supplementary emulsifier; about ½ to about 5 lb/bbl. of a wetting agent and weighting material (barium sulfate or barite) necessary to give the desired mud density; which comprises less than about 800 lb/bbl. of barium sulfate, more preferably about 5 to about 750, and most preferably about 10 to about 700; and about 0.25 to about 4 lb/bbl. of the sulfonated elastomeric polymer.

The oil employed in the oil-based drilling mud is generally a No. 2 diesel fuel, but it can be other commercially available hydrocarbon solvents such as kerosene, fuel oils or selected crude. If crudes are used, they should be weathered and must be free of emulsion breakers.

Typical, but non-limiting examples of suitable emulsifiers which can be readily employed are magnesium or calcium soaps of fatty acids.

Typical, but non-limiting examples of a suitable wetting agent which can be readily employed is an alkylaryl sulfonate.

Typical, but non-limiting examples of a weighting material which can be readily employed is barite or a barium sulfate which may optionally be surface-treated with other cations, such as calsium.

The latex of the neutralized sulfonate-containing terpolymers are formed by a free radical copolymerization process. The monomers used in the free radical emulsion terpolymerization process are styrene monomer and tert-butylstyrene, which are terpolymerized with sulfonate-containing styrene monomer.

In general, the styrene tert-butylstyrene and sulfonate-containing styrene monomer are dispersed in a water phase in the presence of an initiator and a suitable surfactant, wherein the temperature is sufficient to initiate polymerization. The resultant latex is added to the drilling mud formulation at about 0.5 to about 20 lb/bbl., wherein the latex contains about 20 to about 50 weight percent of the sulfonate-containing polymer.

The sulfonate-containing polymers formed from the free emulsion copolymerization process of the instant invention can be generally described as having an Mn of about 5,000 to about 200,000, more preferably about 10,000 to about 100,000. The sulfonate-containing polymers of the instant invention contain about 5 to about 100 meq. of sulfonate groups per 100 grams of polymer, more preferably about 18 to about 90, and most preferably about 20 to about 80. The sulfonate-containing terpolymer which is formed by the instant, free radical emulsion copolymerization process is tert-butylstyrene, styrene/sodium styrene sulfonate terpolymer.

The neutralized sulfonated terpolymers employed in the oil-based drilling muds are formed by a free radical process. The solid sulfonated thermoplastic terpolymers of the instant invention comprises at most 99 percent by weight of styrene, at least 1% by weight of t-butyl styrene and a minor proportion of a metal or amine neutralized sulfonate monomer characterized by the formula:

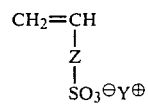

wherein Z is φ
and wherein Y+ is a cation selected from Groups IA, IIA, IB and IIB of the Periodic Table or an amine of the formula:

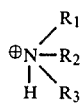

where $R_1$, $R_2$ and $R_3$ can be aliphatic groups of $C_1$ to $C_{12}$ or hydrogen, the terpolymer being water insoluble having about 5 to about 100 meq. of sulfonate groups per 100 grams. Particularly suitable metal cations are sodium, potassium and zinc, and an especially preferred metal cation is sodium. A typical, but non-limiting example of suitable sulfonate-containing monomers is:

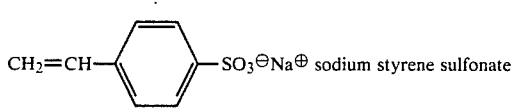 sodium styrene sulfonate

The sulfonate-containing monomers of the instant invention which are water soluble can be generally described as a monomer having unsaturation and a metal or amine sulfonate group.

An especially preferred sulfonate-containing monomer is metal styrene sulfonate. The molar ratio of sulfonate-containing monomer to t-butyl styrene and styrene monomers is about 1/200 to about 1/5, more preferably about 1/150 to about 1/6, and most preferably about 1/100 to about 1/9.

In general, the t-butyl styrene with styrene and sulfonate- containing monomer are dispersed in a water phase in the presence of a suitable free radical initiator and a suitable surfactant, wherein the temperature is sufficient to initiate polymerization. The resultant latex is coagulated, usually by the addition of an aqueous salt solution, and the recovered terpolymer is washed with water and subsequently dried under vacuum at room temperature. Alternatively, the latex can be coagulated by the addition of methanol.

The sulfonated thermoplastic terpolymers formed from the free radical emulsion copolymerization process of the instant invention can be generally described as having an $\overline{M}_n$ as measured by GPC of about 5,000 to about 200,000, more preferably about 10,000 to about 100,000. The terpolymers of the instant invention contain about 18 to about 100 meq. of sulfonate groups per 100 grams of polymer, more preferably about 18 to about 90, and most preferably about 20 to about 80. Furthermore the terpolymers of the instant invention contain about 5 to about 90 mole % of tert-butylstyrene groups, more preferably about 10 to about 75 mole %, and most preferably about 20 to 45 mole %.

A variety of free radical catalysts can be employed in this invention including the water soluble varieties, potassium persulfate, ammonium persulfate, etc. and the oil/water soluble redox couples such as benzoyl peroxide/$(NH_4)_2FeSO_4$.

The surfactants employed for this invention are varied and well-known in the art. The typical emulsifiers or surfactants can be employed; however, some are more effective than others in generating latices of better stability. A preferred emulsifier is sodium lauryl sulfate.

Buffering agents can be used but are not necessary in the instant polymerization process. If used, they are selected from the group consisting of sodium carbonate, ammonia, sodium acetate, trisodium phosphate, etc. These buffering agents are employed at a concentration of about 0.1 to about 5 grams per 100 grams water employed in the emulsion system.

Chain transfer agents can be readily employed in the instant polymerization process for controlling the molecular weight of the resultant terpolymer. The concentration of chain transfer agent is from 0 to about 1.0 grams per 100 grams of the combined weight of the sulfonate-containing monomer and the styrene and t-butyl styrene monomers.

The free radical emulsion copolymerization of the water soluble sulfonate-containing monomer, water-insoluble sytrene and the t-butyl styrene monomers yields a stable latex, wherein the resultant water insoluble terpolymer is not covalently cross-linked, and possesses substantial ionic cross-linking, and has about 5 to about 100 meq. of sulfonate groups per 100 grams of polymer, more preferably about 18 to about 90. The resultant latex can be coagulated by the addition of an aqueous salt solution to the emulsion at a volume ratio of the aqueous salt solution to total volume of the emulsion of about 10 to about 0.5, more preferably about 3 to about 0.7, and most preferably about 2 to about 1. The water insoluble terpolymer is recovered by filtration and substantially washed with water and dried under vacuum conditions. Alternatively, the polymer can be coagulated by precipitation with alcohol such as methanol.

DETAILED DESCRIPTION OF THE PREFERRED EMBODIMENTS

The following examples illustrate the present invention without; however, limiting the same hereto.

EXAMPLE 1

The terpolymer latices are prepared by emulsion techniques that allow incorporation of sodium styrene sulfonate into styrene and t-butyl styrene to form the ion-containing material. A representative example is outlined below.

Into a four-neck flask, we add:
46.0 g. styrene (95 mole %)
3.7 g. tert-butyl styrene (5 mole %)
120 ml. distilled water
2.0 g. sodium styrene sulfonate
3.2 g. sodium lauryl sulfate
0.2 g. potassium persulfate
0.05 g. dodecylthiol The dodecylthiol is a chain transfer agent used to control molecular weight. The flask is flushed with nitrogen, vigorously stirred, and heated to 50° C. for 24 hours. The resulting stable emulsion, containing approximately 5 mole % TBS and 1.9 mole % sodium styrene sulfonate in the terpolymer was short stopped with hydroquinone and cooled to room temperature. This emulsion was used directly in the drilling fluid formation.

EXAMPLE 2

The level of tert-butylstyrene in the polymer can be modified through changes in the concentration of the monomer in the initial polymerizing mixture. For example, a terpolymer containing approximately 25 mole % t-butylstyrene is formed with only a modest change in the styrene and TBS monomer concentration in the previously described (Example 1) formulation. That is:
32.0 g. styrene (75 mole %)
16.4 g. t-butylstyrene (25 mole %)

Again, the resultant latex solution containing approximately 25 mole % TBS and 2.1 mole % sodium styrene sulfonate is used directly in the drilling fluid formulation.

EXAMPLE 3

An oil-based drilling mud was prepared by conventional laboratory methods. The mud contained #2 diesel oil, fresh or calcium chloride water, emulsifier, supplementary emulsifier, a wetting agent, sulfonated styrene, tert-butylstyrene terpolymer, and weighting material. A typical mud was prepared by mixing 205.82 g. of No. 2 diesel oil, 34.76 g. Oil Faze (Magcobar), 1.5 g. SE11 and 1.5 g. DV33 (Magcobar). The mud was weighted with 226.35 g. of Barite and then 4.4 g. of additional CaCl$_2$ were added. The sodium salt of the sulfonated styrene (1.99 mol % sulfonate units) was added at 2 lb/bbl. as either the emulsion or as the precipitate solid. The mud was aged overnight at 150° F. to insure chemical equilibrium. Aliquots of the mud were aged in pressurized cells at 300° and 400° F. for 16 hours. The cells were cooled to room temperature, depressurized, and then the rheological properties of the mud were measured on a Fann Model 35 viscometer at 120° F. It should be noted that these terpolymers were evaluated in "oil" mud systems at a density of 12 lb/gal.

Table I shows the effectiveness of two sulfonated terpolymers (described in Examples 1 and 2) in an oil mud system. These results are directly compared with the base oil mud and a mud containing sulfonated polystyrene (SPS). The data clearly show that the rheological properties of the base mud deteriorates around 250° F., undoubtedly a detrimental feature of this mud system. Interestingly, the addition of SPS does not significantly enhance the low temperature properties of the base mud, but a very marked improvement is observed as the temperature is raised. This pertains to the "thermal activation" phenomena previously described in this application. We further observe only a modest improvement in properties with the (5 mole %) t-butylstyrene/styrene ionomer. We believe this is due to the slightly improved solubility of the terpolymer ionomer in the oil phase. Further additions of t-butylstyrene in the polymer structure would increase the solubility to a larger extent resulting in further improvement in the performance of the mud system. The data in Table I confirm this trend.

The 25 mole % T-BS terpolymer oil-based mud has excellent rheological properties over a broad temperature range. In particular, the properties of these muds remain, to a first approximation, invariant to temperature changes - a very desirable attribute of an oil-based mud system.

TABLE I
t-BUTYLSTYRENE TERPOLYMER/OIL MUD RHEOLOGY

| Temperature | Rheology (120° F.) | Base Oil Mud | Polymer Additive (lbs/bbl.) | | | | | |
|---|---|---|---|---|---|---|---|---|
| | | | SPS | | +5% t-BS | | +25% t-BS | |
| | | | 1.5 | 3.0 | 1.5 | 3.0 | 1.5 | 3.0 |
| 150° F. | PV | 23 | 23 | 22 | 21 | 27 | 31 | 34 |
| | YP | 17 | 10 | 15 | 17 | 19 | 27 | 33 |
| 250° F. | 10 Sec. Gel | 8 | 9 | 7 | 8 | 9 | 13 | 14 |
| | 10 Min. Gel | 10 | 11 | 11 | 14 | 15 | 19 | 27 |
| | PV | 21 | 24 | 29 | 22 | 32 | 36 | 40 |
| | YP | 4 | 5 | 7 | 7 | 8 | 16 | 19 |
| 300° F. | 10 Sec. Gel | 2 | 3 | 3 | 2 | 4 | 5 | 6 |
| | 10 Min. Gel | 2 | 4 | 5 | 4 | 8 | 10 | 13 |
| | PV | 24 | 30 | 27 | 25 | 25 | 35 | 41 |
| | YP | 3 | 6 | 12 | 7 | 12 | 18 | 27 |
| 350° F. | 10 Sec. Gel | 3 | 4 | 5 | 4 | 4 | 7 | 12 |
| | 10 Min. Gel | 3 | 8 | 10 | 10 | 8 | 11 | 22 |
| | PV | 30 | 34 | 30 | 28 | 30 | 34 | 43 |
| | YP | 4 | 6 | 12 | 9 | 10 | 17 | 23 |
| | 10 Sec. Gel | 4 | 3 | 5 | 6 | 7 | 7 | 10 |
| | 10 Min. Gel | 4 | 4 | 11 | 14 | 15 | 15 | 20 |

We claim:
1. An oil-based drilling mud which comprises:
(a) an hydrocarbon liquid substantially immiscible with water;
(b) about 1 to about 10 parts by weight of water per 100 parts by weight of the hydrocarbon liquid;
(c) about 20 to about 50 lb/bbl. of at least one emulsifier;
(d) weighting material necessary to achieve the desired density; and
(e) about 0.25 to about 6.0 lb/bbl. of a neutralized sulfonated thermoplastic terpolymer having an $\overline{M}n$ as measured by GPC of about 5,000 to about 200,000, said neutralized sulfonated thermoplastic polymer having about 5 to about 100 meq. of sulfonate groups per 100 grams of the neutralized sulfonated thermoplastic terpolymer, wherein said sulfonated thermoplastic terpolymer is a terpolymer of t-butyl-styrene/sodium styrene sulfonate/styrene and is prepared by the free radical emulsion terpolymerization of said t-butyl styrene,styrene and sodium styrene sulfonate.

2. A drilling mud according to claim 1 further including a wetting agent wherein said wetting agent is an alkylaryl sulfonate.

3. A drilling mud according to claim 1 wherein said weighting material is barite or barium sulfate.

4. A drilling mud according to claim 1 wherein the concentration level of said weighting material is sufficient to give said drilling mud a specific gravity of about 7 pounds per gallon to about 20 pounds per gallon.

5. A drilling mud according to claim 1 wherein said organic liquid is an oil.

6. A drilling mud according to claim 1 wherein said emulsifier is a magnesium or calcium soap of a fatty acid.

7. A drilling mud according to claim 1 which further includes a polar cosolvent.

8. A drilling mud according to claim 1 wherein said water is salt water.

9. A drilling mud according to claim 1 wherein the concentration of said water is about 3 to about 5 parts by weight per 100 parts by weight of said organic liquid.

10. A drilling mud according to claim 1 wherein said organic liquid is diesel oil.

11. A drilling mud according to claim 1 wherein said neutralized sulfonate terpolymer is a latex containing about 10 to about 60 weight percent of the neutralized sulfonate-containing terpolymer.

* * * * *